United States Patent
Cai

(10) Patent No.: US 8,306,418 B2
(45) Date of Patent: Nov. 6, 2012

(54) DATA PATTERN DEPENDENT DISTORTION COMPENSATION IN A COHERENT OPTICAL SIGNAL RECEIVER

(75) Inventor: Yi Cai, Eatontown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 181 days.

(21) Appl. No.: 12/718,146

(22) Filed: Mar. 5, 2010

(65) Prior Publication Data

US 2010/0232796 A1 Sep. 16, 2010

Related U.S. Application Data

(60) Provisional application No. 61/158,823, filed on Mar. 10, 2009.

(51) Int. Cl.
- H04B 10/08 (2006.01)
- H04B 10/12 (2006.01)
- H04B 10/00 (2006.01)
- H04J 14/02 (2006.01)

(52) U.S. Cl. .............. 398/29; 398/33; 398/81; 398/147; 398/159

(58) Field of Classification Search .............. 398/29, 398/33, 81, 147, 158, 159, 202, 208, 209
See application file for complete search history.

(56) References Cited

U.S. PATENT DOCUMENTS

| | | | |
|---|---|---|---|
| 4,262,360 A | 4/1981 | Bigo et al. | |
| 5,049,830 A | 9/1991 | Yoshida | |
| 6,052,412 A | 4/2000 | Ruether et al. | |
| 6,560,303 B1 | 5/2003 | Fan et al. | |
| 7,031,405 B1 | 4/2006 | Touzni et al. | |
| 7,486,893 B1 | 2/2009 | Pepper et al. | |
| 2001/0005402 A1* | 6/2001 | Nagatani et al. | 375/296 |
| 2004/0197103 A1 | 10/2004 | Roberts et al. | |
| 2004/0208613 A1 | 10/2004 | Sinha et al. | |
| 2005/0147415 A1 | 7/2005 | Fee et al. | |
| 2005/0169412 A1 | 8/2005 | Yang et al. | |
| 2005/0244164 A1* | 11/2005 | Miyashita et al. | 398/147 |
| 2006/0132789 A1 | 6/2006 | Davidson et al. | |
| 2006/0291550 A1 | 12/2006 | Wang et al. | |
| 2007/0002982 A1 | 1/2007 | Heikkila | |
| 2007/0092260 A1 | 4/2007 | Bontu et al. | |
| 2007/0149135 A1* | 6/2007 | Larsson et al. | 455/67.13 |
| 2007/0222654 A1 | 9/2007 | Vrazel et al. | |
| 2007/0300119 A1 | 12/2007 | Hidaka | |

(Continued)

OTHER PUBLICATIONS

Cai, On Performance of Coherent Phase-Shift-Keying Modulation in 40 Gb/s Long-Haul Optical Fiber Transmission Systems, Optical Fiber Communication and the National Fiber Optic Engineers Conference, Mar. 2006, 3 pages, paper JThB11.

(Continued)

Primary Examiner — Dalzid Singh
(74) Attorney, Agent, or Firm — Grossman, Tucker, Perreault & Pfleger, PLLC

(57) ABSTRACT

A distortion compensation system and method may be used to compensate for data pattern dependent signal distortion in a signal received in a coherent optical signal receiver. In general, the distortion compensation system and method compares a received signal field with stored distorted signal waveforms associated with known data patterns and selects a compensation value associated with the distorted signal waveform that corresponds most closely with the received signal field. The distortion compensation system and method compensates the received signal using the selected compensation value and thus mitigates the effects of data pattern dependent signal distortion.

20 Claims, 8 Drawing Sheets

U.S. PATENT DOCUMENTS

| | | | |
|---|---|---|---|
| 2008/0025733 | A1 | 1/2008 | Nazarathy et al. |
| 2008/0240224 | A1 | 10/2008 | Carballo et al. |
| 2008/0267638 | A1 | 10/2008 | Nakashima et al. |
| 2009/0033418 | A1 | 2/2009 | Ericson et al. |
| 2009/0047030 | A1 | 2/2009 | Hoshida |
| 2010/0027609 | A1* | 2/2010 | Wada .................. 375/232 |

OTHER PUBLICATIONS

Ho, Electronic Compensation Technique to Mitigate Nonlinear Phase Noise, Journal of Lightwave Technology, Mar. 2004, pp. 779-783, vol. 22, No. 3.

International Search Report and Written Opinion dated Apr. 28, 2010 issued in PCT Patent Application No. PCT/US10/26508, 11 pages.

International Search Report and Written Opinion dated May 4, 2010 issued in PCT Patent Application No. PCT/US10/26511, 10 pages.

Ip et al., Compensation of Dispersion and Nonlinearity in WDM Transmission using Simplified Digital Backpropagation, IEEE, 2008, pp. 123-124.

Kikuchi, Electronic Post-compensation for Nonlinear Phase Fluctuation in a 1000-km 20-Gbit/s Optical Quadrature Phase-shift Keying Transmission System Using the Digital Coherent Receiver, Optics Express, Jan. 21, 2008, pp. 889-896, vol. 16, No. 2.

Li et al., Electronic post-compensation of WDM transmission impairments using coherent detection and digital signal processing, Optics Express, Jan. 21, 2008, pp. 880-888, vol. 16, No. 2.

Li, Recent advances in coherent optical communication, Advances in Optics and Photonics 1,279?307 [online], Feb. 11, 2009 [retrieved on Apr. 15, 2010],Retrieved from the Internet<URL:http://ofc.optics.ucf.edu/research/Recent%20advances%20in%20coherent%20optical%20communiation.pdf.

Liu, Digital self-coherent detection, Optics Express vol. 16, No. 2 [online], Jan. 21, 2008 [retrieved on Apr. 15, 2010], Retrieved from the Internet<URL:http://www.opticsinfobase.org/view_article,cfm?gotourl=http%3A%2F%2Fwww%2Eopticsinfobase%2Eorg%2FDirectPDFAccese%26id%3D148802%26seq%3D0&org=.

Noe, "PLL-Free Synchronous QPSK Polarization Multiplex/Diversity Receiver Concept With Digital I&Q Baseband Processing," IEEE Photonics Technology Letters, vol. 17, No. 4, pp. 887-889 (Apr. 2005).

Ly-Gagnon et al.., "Coherent Detection of Optical Quadrature Phase-Shift Keying Signals With Carrier Phase Estimation," Journal of Lightwave Technology, vol. 24, No. 1, pp. 12-21 (Jan. 2006).

Cai, et al., "Comparison of Two Carrier Phase Estimation Schemes in Optical Coherent Detection Systems," Optical Fiber Communication and the National Fiber Optic Engineers Conference, 2007, pp. 1-3 (Mar. 2007).

International Search Report and Written Opinion dated Apr. 27, 2010 issued in related International Patent Application No. PCT/US10/26504.

International Search Report and Written Opinion dated May 12, 2010 issued in PCT Patent Application No. PCT/US10/26513, 10 pages.

* cited by examiner

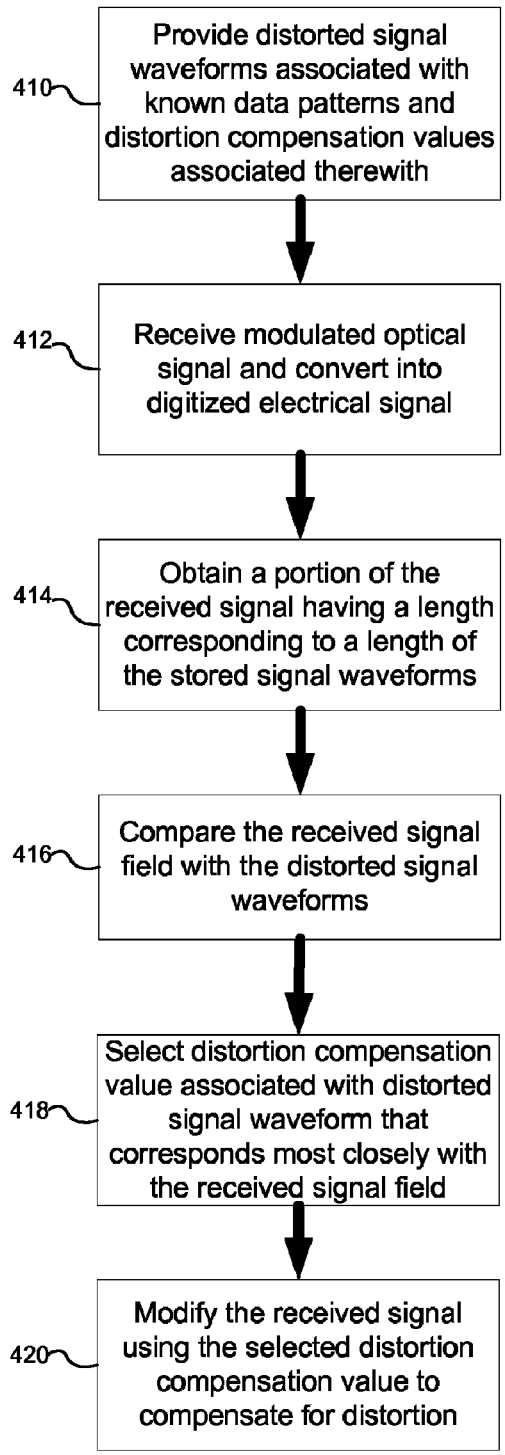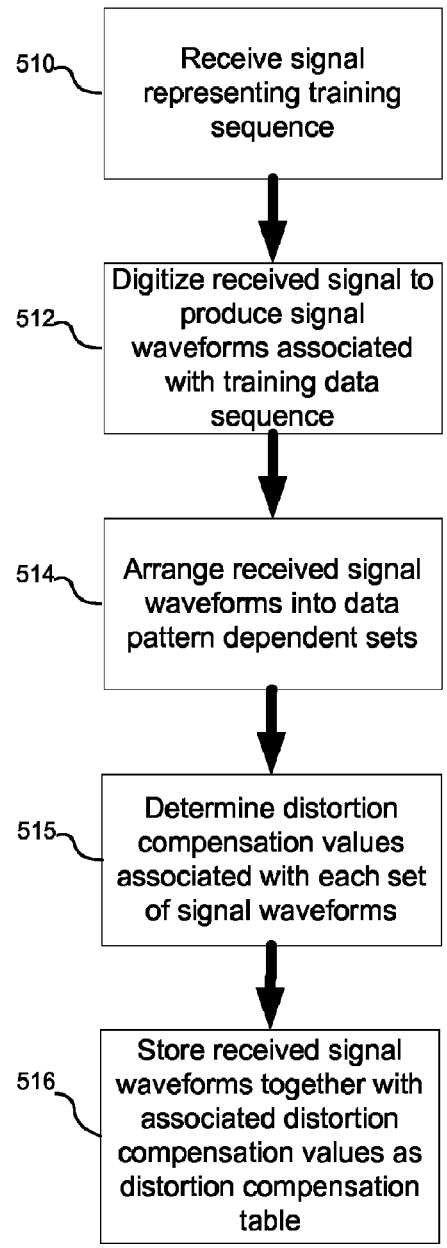
FIG. 4
FIG. 5

DATA PATTERN DEPENDENT DISTORTION COMPENSATION IN A COHERENT OPTICAL SIGNAL RECEIVER

CROSS-REFERENCE TO RELATED APPLICATIONS

The present application claims the benefit of U.S. Provisional Patent Application Ser. No. 61/158,823, filed on Mar. 10, 2009, which is fully incorporated herein by reference.

TECHNICAL FIELD

The present disclosure relates to the optical transmission of information and more particularly, data pattern dependent distortion compensation in a coherent optical signal receiver.

BACKGROUND INFORMATION

Signals may be used to transmit data over distances. In optical communication systems, for example, data may be modulated on one or more optical wavelengths to produce modulated optical signals that may be transmitted over optical waveguides such as optical fibers. One modulation scheme that may be used in optical communication systems is phase shift keying in which data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of phase shift keying and differential phase shift keying formats, such as return-to-zero DPSK (RZ-DPSK). Another modulation format is quadrature amplitude modulation (QAM) in which information is modulated onto both phase and amplitude of a transmitted signal.

To receive the data, the signals may be detected and demodulated. In phase modulated optical communication systems, for example, coherent optical receivers may use coherent detection to detect modulated optical signals and may provide sensitivity advantages over receivers using non-coherent detection. Digital signal processing (DSP) may be implemented in such systems for processing the received signals to provide a demodulated data. Digital signal processing of the received signal provides speed and flexibility and may be used to perform a variety of functions including estimation of the carrier phase of the received signals and data detection using the estimated carrier phase.

Distortion of a signal (e.g., in a transmitting terminal, during transmission, or in a receiving terminal), however, may adversely affect the integrity of the data that is obtained after detecting and demodulating the signal. In optical communications systems using phase modulation schemes, nonlinear effects, such as self phase modulation (SPM), may cause phase distortion in the modulated signal, which may significantly degrade coherent-detection performance and diminish the receiver-sensitivity advantage that coherent detection has over non-coherent detection. The degradation in BPSK signals is described in greater detail in Yi Cai, et. al., "On Performance of Coherent Phase-Shift-Keying Modulation in 40 Gb/s Long-Haul Optical Fiber Transmission Systems", Optical Fiber Communication and the National Fiber Optic Engineers Conference, 2006, paper JThB 11 (March 2006), which is fully incorporated herein by reference. Intersymbol interference may also occur in optical signals that use phase modulation schemes.

The distortion in a modulated signal, such as intersymbol interference or phase distortion in a modulated optical signal, may often be dependent on the data pattern or bit-pattern. FIGS. 9 and 10 illustrate bit-pattern dependent phase distortions that may occur in an optical communication system based on a single-channel nonlinear propagation simulation. FIG. 9 shows a constellation diagram of a distorted BPSK signal in which the constellation points extend above and below the real axis, indicating the effect of phase distortion. FIG. 10 shows phase distortions corresponding to various bit patterns and illustrates how the phase distortions are dependent on bit pattern.

Methods have been proposed for mitigating the performance penalty induced by data-pattern dependent distortion such as nonlinear phase distortion in optical coherent receivers. One method compensates nonlinear phase distortion based on estimated phase distortion as a function of received signal intensity, for example, as described in K. Ho and J. Kahn, "Electronic compensation technique to mitigate nonlinear phase noise," Journal of Lightwave Technology, 22, 779-783 (2004) and in K. Kikuchi "Electronic Post-compensation for nonlinear Phase Fluctuations in a 1000-km 20-Gb/s Optical Quadrature Phase-shift Keying Transmission System Using the Digital Coherent Receiver," Optics Express, Vol. 16, No. 2, 2007, which are fully incorporated herein by reference. This method may fail, however, when optical signal intensity changes significantly during propagation, which is often the case in optical communication systems employing a practical chromatic dispersion map.

Another method compensates nonlinear distortion by digital backpropagation, for example, as described in X. Li, X. Chen, G. Goldfarb, E. Mateo, I. Kim, F. Yaman and G. Li, "Electronic post-compensation of WDM transmission impairments using coherent detection and digital signal processing," Optics Express, vol. 16, no. 2, pp. 880-888, Jan. 21, 2008, and in E. Ip, A. P. T. Lau, D. J. Barros and J. M. Kahn, "Compensation of chromatic dispersion and nonlinearity using simplified digital backpropagation," Proc. of OSA Topical Meeting on Coherent Optical Technologies and Applications, Boston, Mass., Jul. 13-16, 2008, which are fully incorporated herein by reference. This backpropagation method involves complicated calculations and may not be practical in 10-100 Gb/s optical transmissions.

BRIEF DESCRIPTION OF THE DRAWINGS

These and other features and advantages will be better understood by reading the following detailed description, taken together with the drawings wherein:

FIG. 4 is a flow chart illustrating a method for compensating for data pattern dependent signal distortion, consistent with an embodiment of the present disclosure.

FIG. 5 is a flow chart illustrating a method for training a distortion compensation system, consistent with an embodiment of the present disclosure.

DETAILED DESCRIPTION

A distortion compensation system and method, consistent with the present disclosure, may be used to compensate for data pattern dependent signal distortion in a signal received in a coherent optical signal receiver. In general, the distortion compensation system and method compares a received signal field (i.e., phase and amplitude) with stored distorted signal waveforms associated with known data patterns and selects a compensation value associated with the distorted signal waveform that corresponds most closely with the received signal field. The distortion compensation system and method compensates the received signal using the selected compensation value and thus mitigates the effects of data pattern dependent signal distortion.

As used herein, "distortion compensation" refers to a modification of a received signal to provide at least some reduction in the distortion present in the received signal. Although distortion compensation may include the elimination of distortion such that the received signal is substantially identical to the transmitted signal before the distortion occurs, this is not a limitation and is not required by the embodiments described herein.

According to exemplary embodiments, distortion compensation systems and methods described herein may be used in an optical communication system to mitigate the effects of bit-pattern dependent phase distortion in phase modulated optical signals. The phase modulated optical signals may be modulated using a phase shift keying modulation scheme such as BPSK, QPSK, DPSK, DQPSK, or some other higher order nPSK scheme, or some variation thereof (e.g., RZ-DPSK). In an optical communication system, bit-pattern dependent signal distortion may be caused by fiber nonlinear effects such as self phase modulation (SPM) or other nonlinearities, or by intersymbol interference or other linear distortion. The distortion compensation systems and methods described herein may also be used in other communication systems in which data pattern dependent signal distortion occurs in a transmitted signal.

Figure 1:
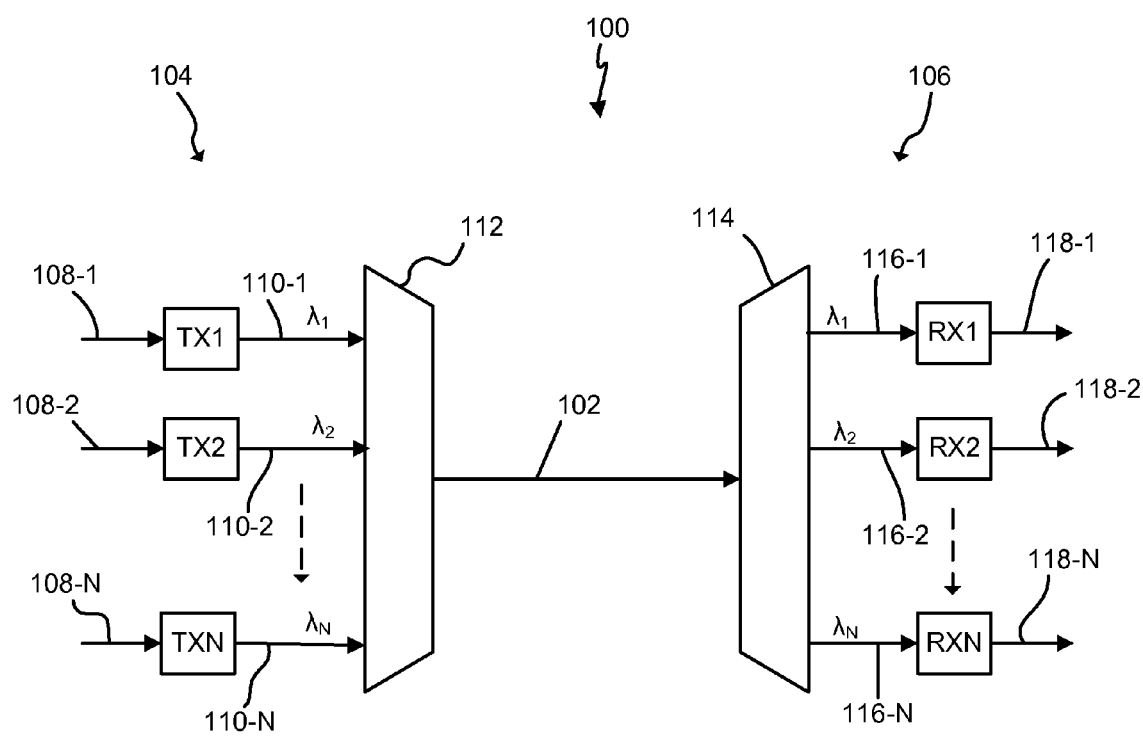
FIG. 1 is a block diagram of one exemplary embodiment of a system consistent with the present disclosure.

FIG. 1 is a simplified block diagram of one exemplary embodiment of a WDM transmission system 100 in which a distortion compensation system and method may be used consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a PSK modulation format, such as DBPSK, DQPSK, RZ-DPSK, RZ-DQPSK, etc. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N.

Figure 2:
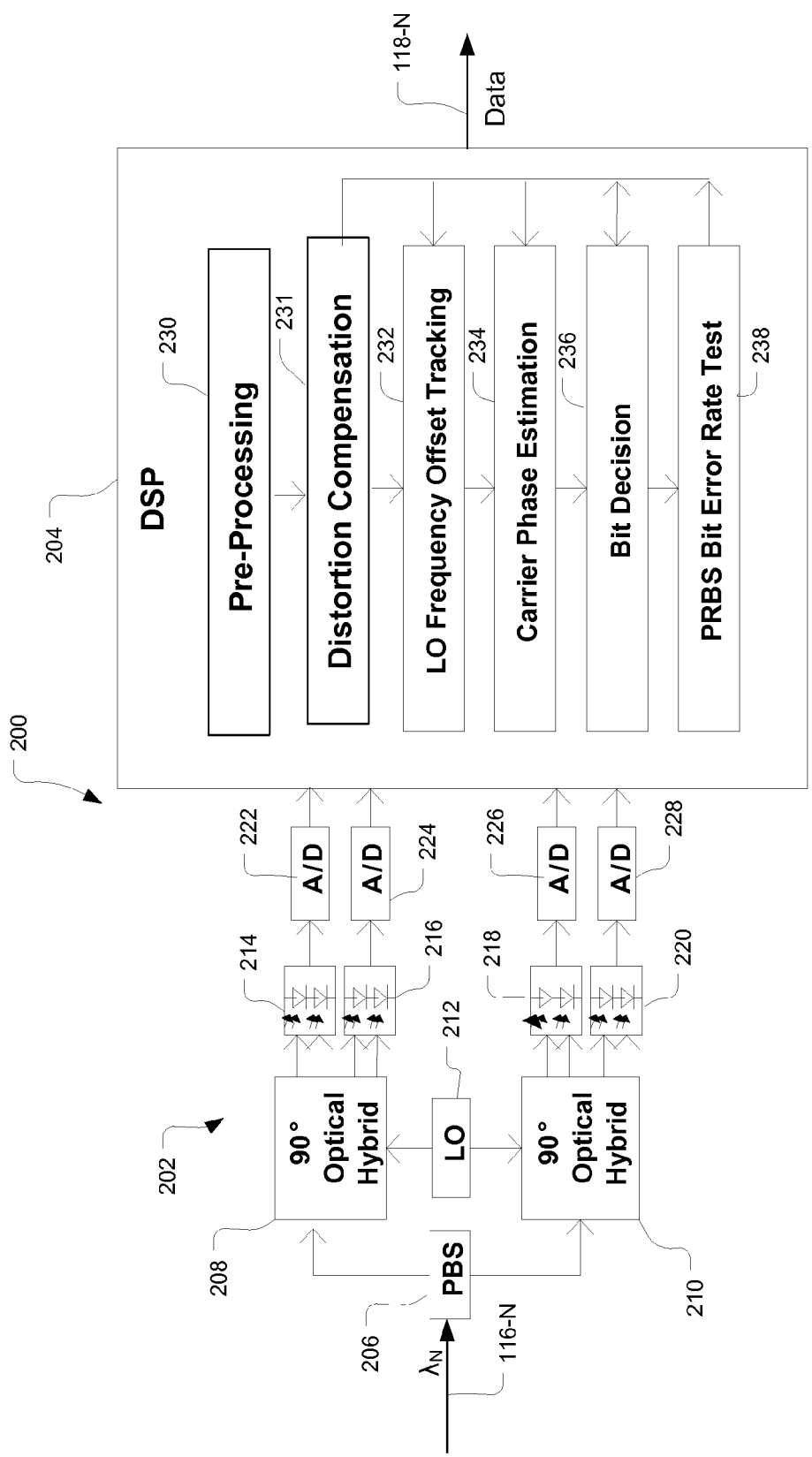
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a coherent receiver configuration 202 for receiving an input signal on path 116-N and a digital signal processing (DSP) circuit 204 for processing the output of the coherent receiver to provide an output data signal on path 118-N. Data is modulated on the carrier wavelength $\lambda_N$ of the optical input signal according to a PSK modulation format. The coherent receiver 202 converts the received optical input signal into one or more digital signals that are provided as inputs to the DSP circuit 204. The DSP circuit demodulates the data from the digital signals to provide an output data stream on path 118-N representative of the data modulated on the carrier wavelength The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described below. In general, different polarizations of the input optical signal are split onto separate paths by the PBS 206. Each polarization is provided to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228.

The digital outputs of the A/D converters are provided as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 230, a distortion compensation function 231, an optional local oscillator (LO) frequency offset tracking function 232, a carrier phase estimation function 234, a bit decision function 236 and an optional PRBS bit error rate function 238. These functions may be implemented in a variety of configurations using any combination of hardware, software and/or firmware. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The pre-processing function 230 of the DSP may include various optical signal detection functions implemented in different types of DSP-based coherent detection receivers. The pre-processing functions may include, for example, a waveform recovery and alignment function, a clock recovery function, a synchronized data re-sampling function, and a polarization tracking and polarization mode dispersion (PMD) compensation function. The distortion compensation function 231 may be configured to compensate for data pattern dependent distortion in the received signal consistent with embodiments described herein. The optional LO frequency offset tracking function 232 may be configured to track and compensate for frequency offset between the received signal and the LO signal.

In general, since the data in a PSK modulated signal is encoded in the phase of an optical carrier signal, demodulation of a PSK modulated signal in a DSP-based receiver involves estimating and tracking the carrier phase. The carrier phase estimation function 234 is provided for this purpose and may be configured as a dual stage carrier phase estimation function. The carrier phase estimate from the carrier phase estimation function is provided to a bit decision function 236 which determines the data or bit values represented by the carrier phase in the modulated signal. In some embodiments, the bit decision function 236 may also mitigate the effects of data pattern dependent signal distortion such as phase distortion. The data may then be provided on an output on path 118-N representative of the data modulated on the carrier wavelength $\lambda_N$. The optional error rate testing function 238 may be configured for performing a bit error rate (BER) test on training sequence signal for testing performance of the DSP circuit 204.

Figure 3:
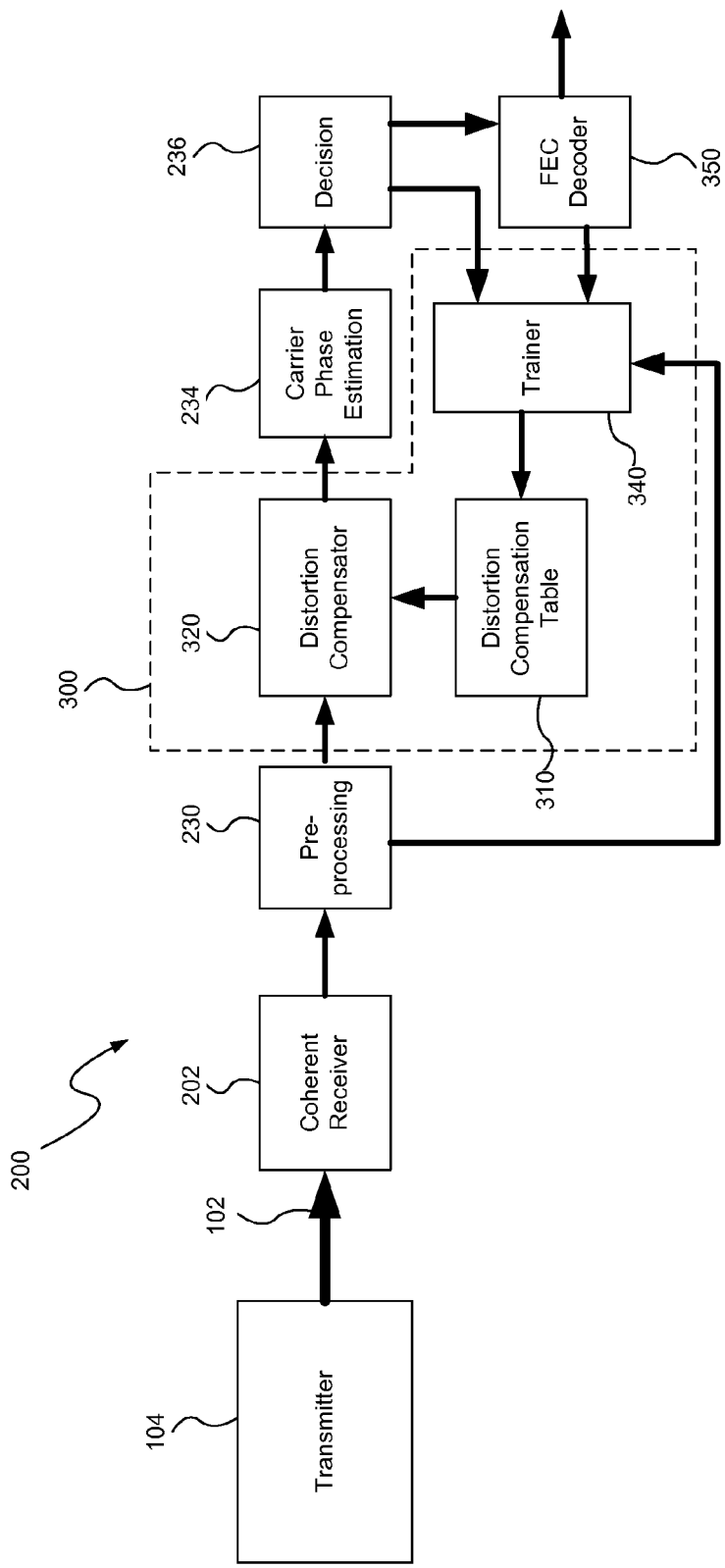
FIG. 3 is a block diagram of a communication system including a receiver with a distortion compensation system to compensate for data pattern dependent signal distortion, consistent with an embodiment of the present disclosure.

FIG. 3 shows a simplified communication system incorporating a distortion compensation system 300 that may be used to perform distortion compensation of the received signal to mitigate the effects of data pattern dependent distortion in the signal. The distortion compensation system 300 may be implemented in the DSP circuit 204 coupled to the coherent receiver 202 as described above. For simplicity and ease of explanation, the system is shown including only a single coherent receiver for receiving only a single wavelength. It is to be understood that the system may be configured as a WDM system including demultiplexer and a plurality of receivers for receiving multiple wavelengths. In other embodiments, the distortion compensation system 300 may be used in other communication systems with other types of receivers.

In the exemplary embodiment, the coherent receiver 202 receives, detects and digitizes an optical signal that was transmitted by a transmitter or transmitting terminal 104. In an optical system transmitting phase modulated optical signals, for example, the coherent receiver 202 receives the optical signal, detects the electrical field of the received optical signal, and produces a digitized received signal representing the phase of the symbols in the optical signal and thus the data modulated on the optical signal. The pre-processing function 230 may perform pre-processing of the digitized received signal.

The distortion compensation system 300 may then process the digitized received signal to compensate for data pattern dependent signal distortion, for example, before the carrier phase estimation function 234 provides carrier phase estimates. In the exemplary embodiment, the distortion compensation system 300 processes the samples by comparing the received signal field to stored distorted signal waveforms and by selecting and applying a distortion compensation value associated with a distorted signal waveform that corresponds most closely to the received signal field. The decision function 236 may then determine the data values (e.g., the bit values) represented by the carrier phase estimates and provide an output including the data or bit values. The distortion compensation system 300 may thus allow improved carrier phase estimation by providing a digitized signal with less distortion to the carrier phase estimation function 234.

In an embodiment, the carrier phase estimation function 234 may use dual stage carrier phase estimation, for example, as disclosed in U.S. Provisional Application Ser. No. 61/159, 018 and U.S. patent application Ser. No. 12/718,124, which is incorporated herein by reference. The distortion compensation system 300 may be used in systems with carrier phase estimation such as systems using coherent PSK or differential-coding PSK (e.g., DCPSK, DCBPSK, DCQPSK, etc.). The distortion compensation system 300 may also be used to compensate for distortion in the received signal in systems without carrier phase estimation, for example, in systems using coherent differential phase shift keying (e.g., DPSK, DBPSK, DQPSK, etc.).

The distortion compensation system 300 includes a distortion compensation table 310 for storing distorted signal waveforms associated with known data patterns and the distortion compensation values associated therewith. The distortion compensation system 300 also includes a distortion compensator 320 for comparing a received signal field with the stored distorted signal waveforms and selecting a distortion compensation value associated with the stored signal waveform that corresponds most closely. The distortion compensator 320 may obtain a portion of the received digitized signal (e.g., using a shift register) within a shifting window having a length corresponding to the length of the distorted signal waveforms stored in the distortion compensation table 310. The distortion compensation table 310 may be stored, for example, in a memory within or coupled to the DSP circuit.

The distortion compensator 320 may be implemented as hardware, software, firmware, or a combination thereof in the DSP circuit.

In the exemplary embodiment, the stored signal waveforms may be N-symbol segments including a pattern of a predetermined number (N) of symbols (e.g., a 5-bit pattern may include 00000, 00001, 00010, . . . ). As such, the distortion compensation table 310 may be an N-symbol table that stores N-symbol signal waveforms (and associated distortion compensation values) having a length of N symbols and the distortion compensator 320 may use an N-symbol shifting window to obtain an N-symbol received signal field. The distortion compensation table 310 may also be indexed by the data or bit patterns corresponding to the N-symbol waveforms.

When a N-symbol received signal field is fed to the distortion compensator 320, the distortion compensator 320 compares the N-symbol received signal field to the entries in the table 310 and searches for the stored distorted signal waveform that corresponds most closely to the N-symbol received signal field by using a similarity calculation such as a maximum a posteriori probability (MAP) detection algorithm. For example, the distortion compensator 320 may calculate and compare the Euclidean distances between the N-symbol received signal field and the stored N-symbol distorted signal waveforms in the distortion compensation table 310. The stored N-symbol signal waveform with the minimum Euclidean distance to the received signal field is determined to correspond most closely. The Euclidean distance between a received signal field within an N-symbol window $(rs_1, rs_2, \ldots, rs_N)$ and stored N-symbol waveform $(ss_1, ss_2, \ldots, ss_N)$ may be calculated as follows:

$$ED = \sqrt{(rs_1-ss_1)^2 + (rs_2-ss_s)^2 + \ldots + (rs_N-ss_N)^2}$$

Other similar algorithms may also be used to determine the distorted signal waveforms that correspond most closely. According to another embodiment, for example, a maximum correlation criterion may be used to determine the distorted signal waveforms that most closely correspond. A Chase algorithm may also be used to increase the speed of a minimum Euclidean distance or maximum correlation search of the distortion compensation table. According to a further embodiment, a maximum likelihood sequence estimation (MLSE) algorithm may be used to determine the distorted signal waveforms that correspond most closely.

Once the distortion compensator 320 has found the stored N-symbol distorted signal waveform that corresponds most closely, the distortion compensation value associated with that stored signal waveform in the distortion compensation table 310 is selected and used to compensate for distortion in the received signal field. The compensated signal may then be provided to the carrier phase estimation function 234 (or directly to the decision function 236 in a system without carrier phase estimation).

According to an embodiment, the distortion compensator 320 may also account for an unknown phase offset (i.e., in carrier phase) between the received signal and a target phase constellation corresponding to the modulation format or scheme being used. In this embodiment, the phase of the received signal field may be rotated by some predefined step size (or adaptive step size). For each phase rotation of the received signal field, the distortion compensator 320 may perform the search of the distortion compensation table 310 for the distorted signal waveform that corresponds most closed, as described above. The distortion compensator 320 may compare the maximum similarity values (e.g., the Euclidean distances) of a current phase rotation of the received signal field with previous phase rotations of the received signal field to determine a global maximum similarity entry in the distortion compensation table after a total $2\pi$ phase rotation. The distortion compensation value associated with the distorted signal waveform that corresponds most closely to the received signal field, considering all of the phase rotation steps, may then be selected and applied.

The distortion compensation system 300 may further include a trainer 340 for training the system using distorted signals representing known data patterns to generate the distortion compensation table 310. The trainer 340 may be implemented as hardware, software, firmware, or a combination thereof in the DSP circuit. To perform a training function, a preset training sequence, such as a pseudo random bit sequence (PRBS), may be transmitted by the transmitter 104. The coherent receiver 202 receives, detects and digitizes the training sequence signal, which may be distorted as a result of data pattern dependent distortion (e.g., phase distortion or intersymbol interference in an optical signal).

The trainer 340 may obtain the received training sequence signal (e.g., within a shifting N-symbol window) and arranges the received signal waveform N-symbol segments into data pattern dependent sets based on the data pattern in the window. For N-bit data patterns, for example, the trainer 340 may arrange the received signal waveforms based on an N-bit pattern in an N-bit window around each bit. In one example, 5-bit data patterns may be arranged such that signal waveforms associated with 00000 bit patterns are arranged in a set, signal waveforms associated with 00001 bit patterns are arranged in a set, signal waveforms associated with 00010 bit patterns are arranged in a set, etc. The trainer 340 may then average the waveforms in each set to mitigate noise effects and store the averaged waveforms in memory as the distortion compensation table 310 indexed by the bit patterns. For each of the stored waveforms, the trainer 340 may also calculate a compensation value based on the difference between the distorted signal field (i.e., phase and amplitude) and the corresponding transmitted signal field without the distortion. The distortion compensation value may thus include a value capable of being applied to a distorted received signal to produce a compensated signal more similar to the corresponding transmitted undistorted signal. The calculated distortion compensation values may be stored with the associated N-symbol distorted signal waveforms in the table 310.

The trainer 340 may perform the training and generate the distortion compensation table 310 at the initial stage of system operation. The trainer 340 may also update the distortion compensation table during system operations using preset non-user data and/or may be adaptively updated with the output of the decision function 236 and/or forward error correction (FEC) data and the received signal field. Updating the distortion compensation table allows the penalty mitigation to adapt to changes, such as polarization mode dispersion (PMD), in the transmission system.

In some embodiments, the distortion compensation system 300 may also use soft decision forward error correction (FEC) to improve performance. FEC involves insertion of a suitable error correction code into a transmitted data stream to facilitate detection and correction of data errors about which there is no previously known information. Error correction codes are generated in an FEC encoder (e.g., in the transmitter 104) for the data stream. FEC encoding/decoding may be implemented according to a variety of FEC schemes including, but not limited to, the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC) and the low density parity check (LDPC) code.

In soft decision FEC, multiple bit "soft" information is generated that represents a confidence level or reliability of the received data (e.g., whether a bit is very likely one, likely one, likely zero, or most likely zero). The additional "soft" information enables more efficient FEC decoding. Examples of soft decision FEC are disclosed in greater detail in U.S. Pat. No. 7,398,454, U.S. Patent Application Publication No. 2006/0136798, and U.S. patent application Ser. No. 12/108, 155, all of which are fully incorporated herein by reference.

To implement soft decision FEC decoding, the detection system 300 may include a soft decision FEC decoder 350 in combination with the decision function 236. The decision function 236 may generate a soft-decision data stream, and the soft decision FEC decoder 350 receives the soft-decision data stream, recovers the error correction codes and uses them to correct any errors in the received data stream. In an embodiment, the decision function 236 may calculate a reliability of each decision bit to generate the soft-decision data stream. The reliability calculation may be based on the calculated Euclidean distances, maximum correlation criterion, or other criteria representing how closely the received signal samples correspond to the known bit patterns.

The trainer 340 may also be responsive to feedback from the FEC decoder 350 to adjust the calculated distortion compensation values in the distortion compensation table 310, which may further improve the system performance. If the FEC decoder 350 corrects one of the bit values in a received N-symbol pattern of a training sequence, for example, the soft information fed back to the trainer 340 for that bit pattern reflects the corrected bit. The corrected soft information may then be used by the trainer 340 to modify the distortion compensation value for that N-symbol pattern, for example, by updating the distortion compensation table 310.

FIGS. 4 and 5 show methods consistent with the present disclosure. FIG. 4 illustrates a distortion compensation method for compensating for data pattern dependent signal distortion in a signal. This distortion compensation method may be implemented using the systems shown in FIGS. 1-3 or in other systems that receive and detect signals having data pattern dependent signal distortion. According to the distortion compensation method, distorted signal waveforms associated with known data patterns are provided 410 together with the associated distortion compensation values (e.g., by training and creating an N-symbol distortion compensation table). The distortion compensation method also includes receiving 412 a modulated optical signal and converting the optical signal into a digitized electrical signal (e.g., using a coherent receiver) and obtaining 414 a portion of the received signal having a length corresponding to a length of the stored signal waveforms (e.g., within an N-symbol sliding window). The distortion compensation method further includes comparing 416 the signal field of the portion of the received signal (e.g., within the sliding window) with the distorted signal waveforms and selecting 418 the distortion compensation value associated with the distorted signal waveform that corresponds most closely with the received signal field (e.g., using MAP detection techniques). The received signal is then modified 420 using the selected distortion compensation value to compensate for distortion.

FIG. 5 illustrates a training method for training a system for compensating for data pattern dependent signal distortion in a signal. This training method may be implemented using the systems shown in FIGS. 1-3 or in other systems that receive and detect signals having data pattern dependent signal distortion. The training method includes receiving 510 a signal representing a training sequence (e.g., a PRBS) that includes signal distortion and digitizing 512 the received signal to produce distorted signal waveforms associated with the training data sequence (e.g., using a coherent receiver). The training method also includes arranging 514 the received distorted signal waveforms (e.g., N-symbol segments) into data pattern dependent sets and determining 515 the distortion compensation values that correspond to the distorted signal waveforms. The training method further includes storing 516 the received signal waveforms together with the distortion compensation values as a distortion compensation table indexed by data patterns.

Figure 7:
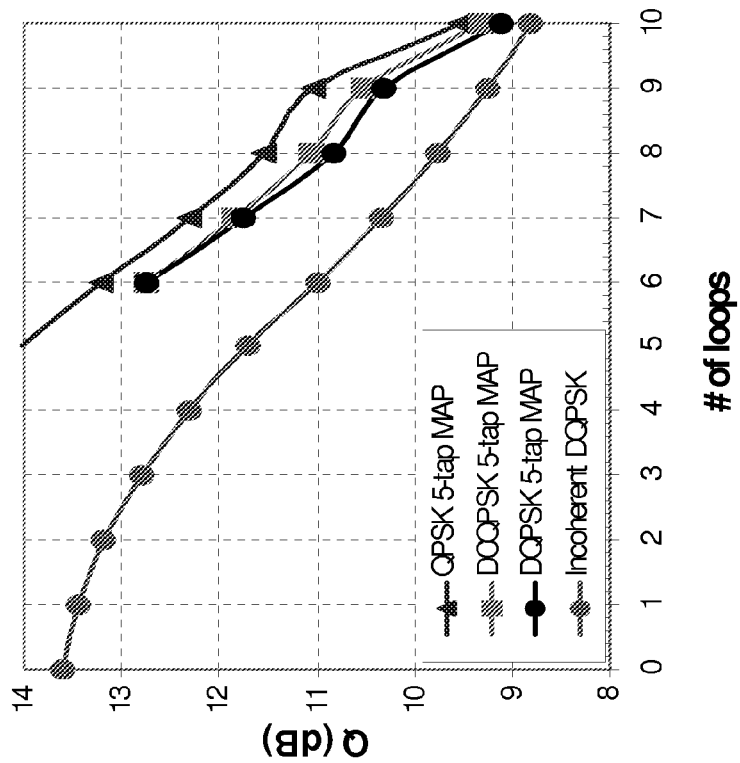
FIGS. 6 and 7 are plots illustrating Q factor for different phase modulation schemes in simulated optical systems without MAP detection for distortion compensation and with MAP detection for distortion compensation, respectively.
Figure 6:
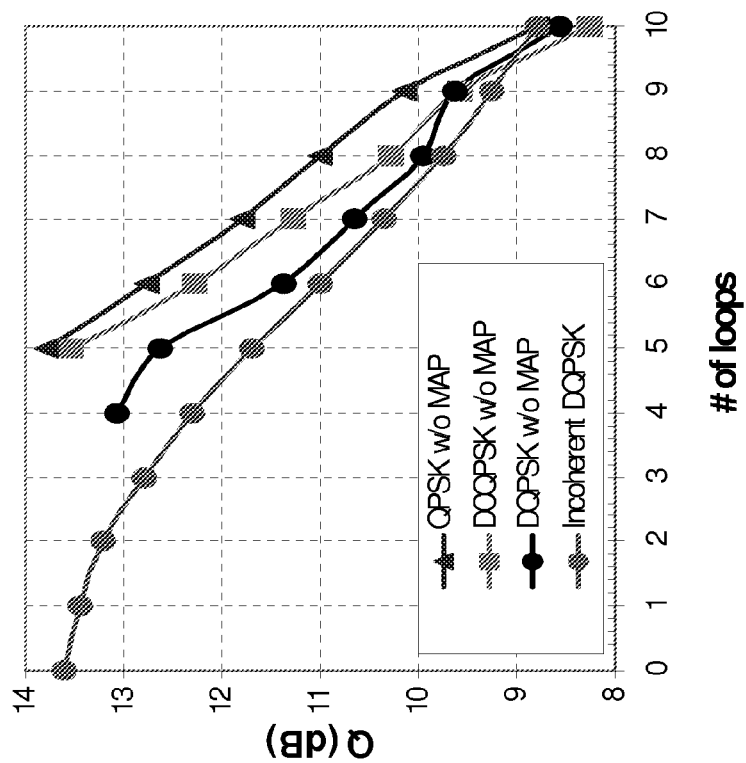
Figure 8:
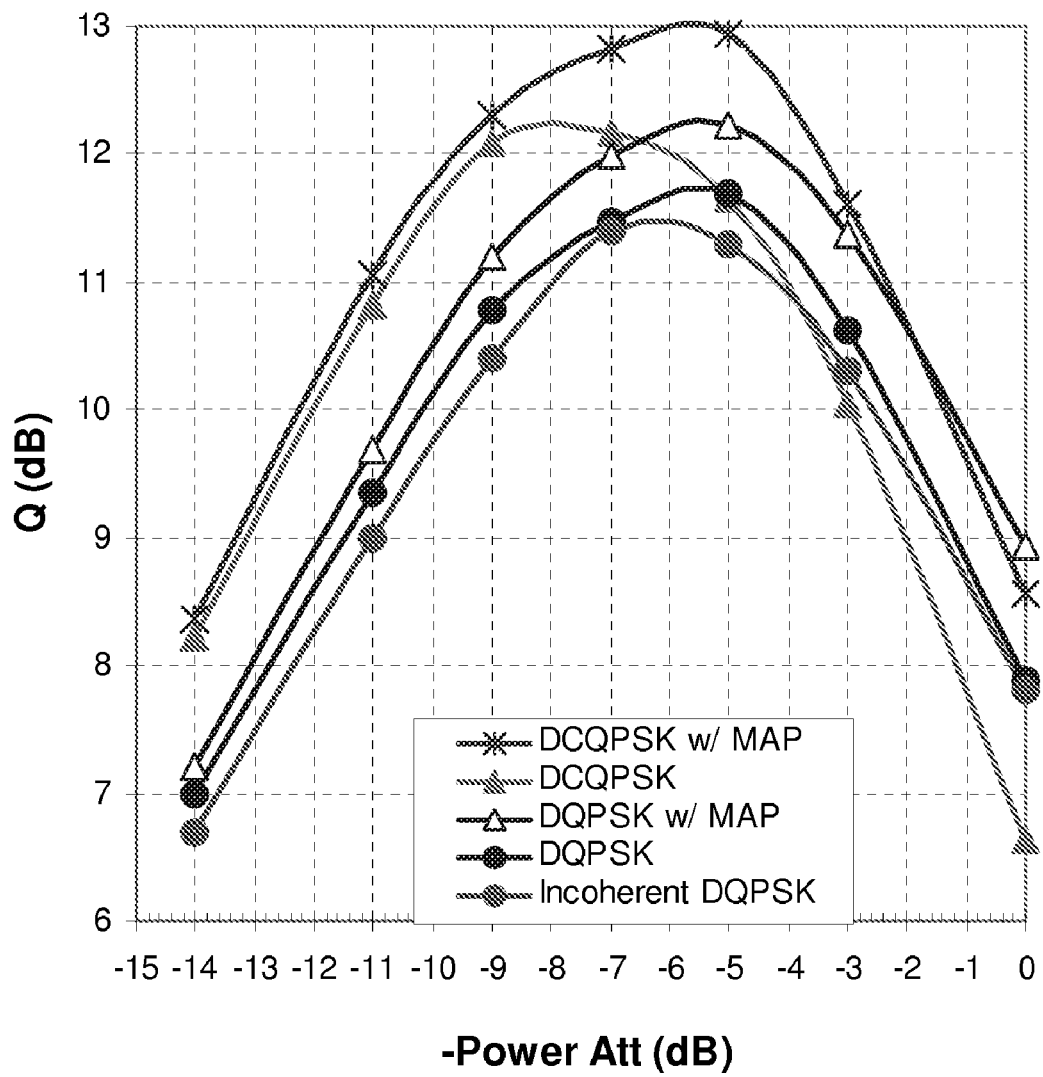
FIG. 8 is a plot illustrating a Q factor as a function of channel power for simulated optical systems with and without MAP detection for distortion compensation and with different modulation formats.
Figure 9:
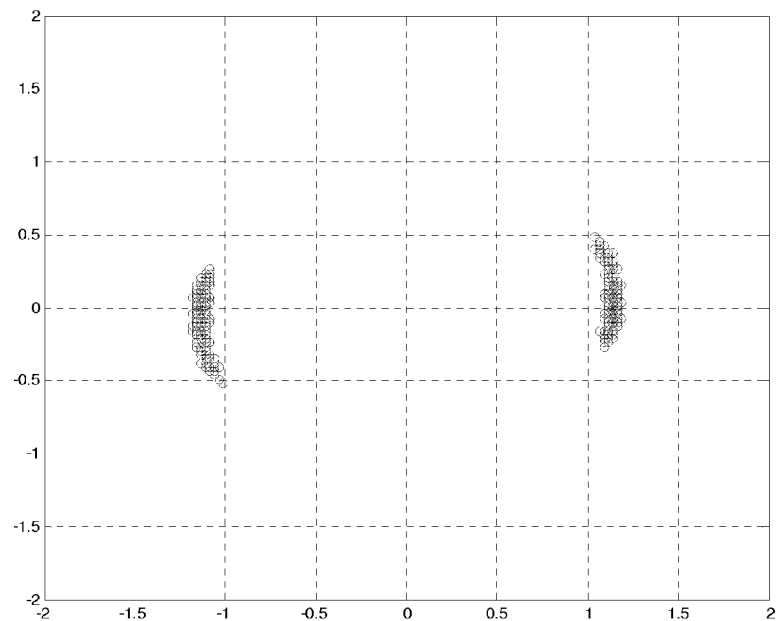
FIG. 9 is a constellation diagram illustrating a distorted BPSK signal.
Figure 10:
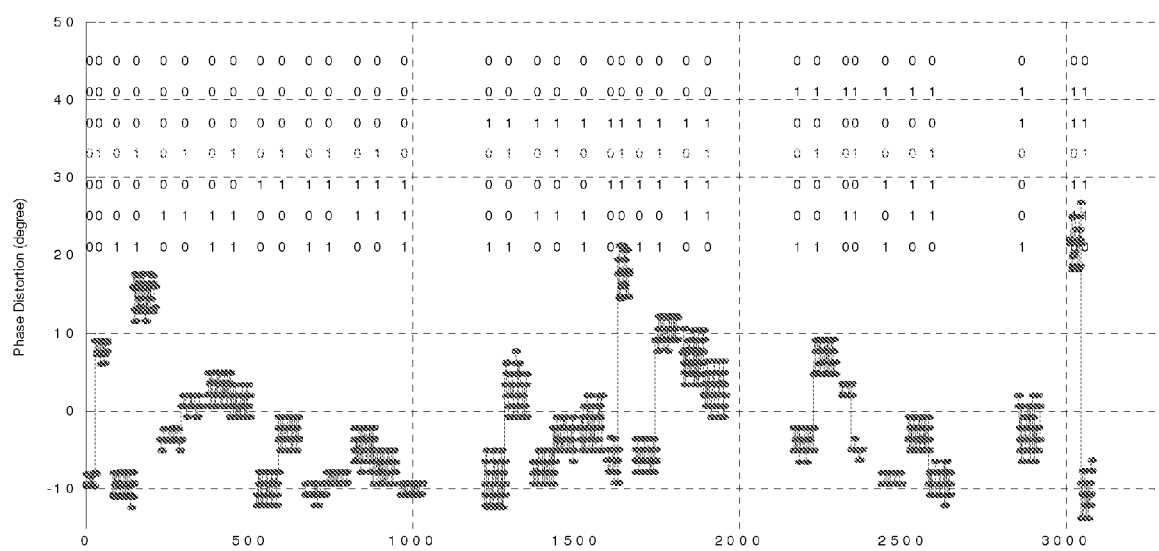
FIG. 10 is a diagram illustrating bit-pattern dependent phase distortions associated with different bit patterns.

FIGS. 6-8 illustrate the effectiveness of the system and method for mitigating data pattern dependent distortion in transmitted signals in simulated systems. FIGS. 6 and 7 illustrate the Q factors as a function of the number of loops of the simulated system. As shown, the Q factor is higher in the simulated systems using MAP detection for distortion compensation (FIG. 7) as compared to the simulated systems without MAP detection for distortion compensation (FIG. 6). FIG. 8 further illustrates the Q factors as a function of channel power for different phase shift keying modulation schemes with and without MAP detection for distortion compensation.

Figure 11:
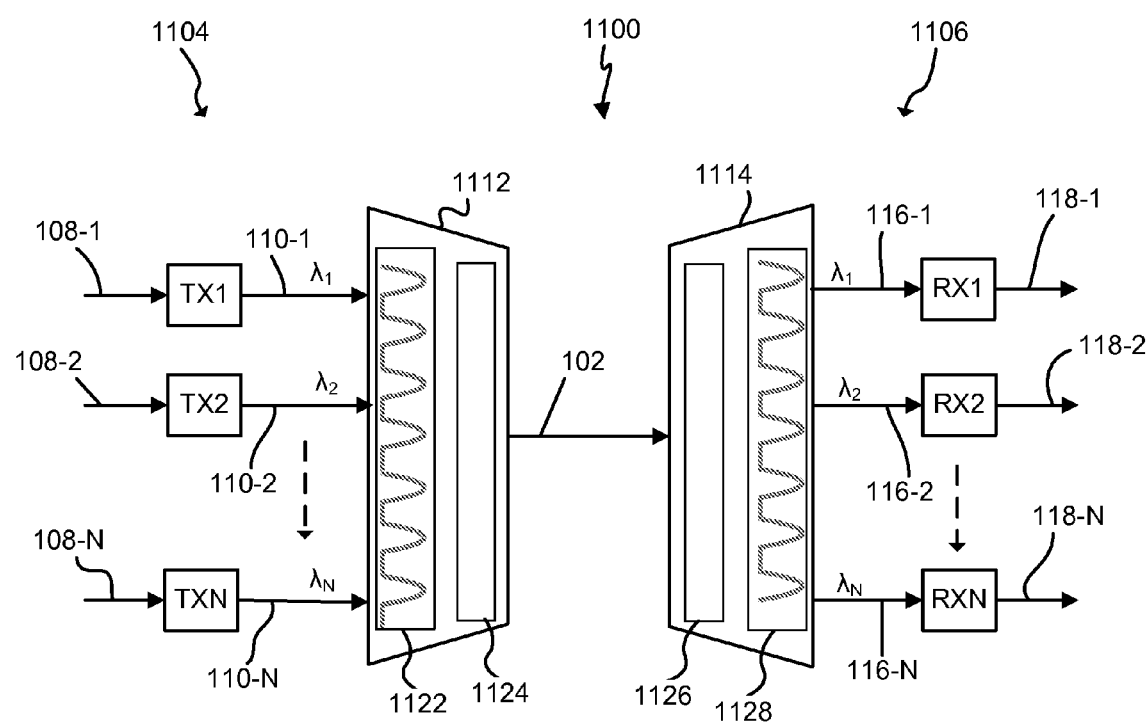
FIG. 11 is a block diagram of one exemplary embodiment of a WDM transmission system with overfiltering in the multiplexer and demultiplexer, consistent with the present disclosure.

Referring to FIG. 11, the distortion compensation system may also be used to mitigate data pattern dependent distortion in transmitted signals in a high-spectral-efficiency 100 Gb/s WDM transmission system 1100. In this embodiment, a spectral efficiency of 400% may be achieved by transmitting 25 Gbaud 2-polarization QPSK channels on a 25 GHz WDM spacing. According to this embodiment of the WDM transmission system 1100, the transmitting terminal 1104 may perform overfiltering (e.g., 20% more filtering than conventional WDM multiplexers) of the WDM channels (i.e. wavelengths $\lambda_1, \lambda_2 \ldots \lambda_N$) as the channels are combined to provide the aggregate WDM optical signal on the optical transmission path 102. In the transmitting terminal 1104, the WDM channels may be filtered and combined in the multiplexer 1112 using an optical interleaving filter 1122 and directional couplers 1124. In a similar fashion the WDM channels may be demultiplexed at the receiving terminal 1106 by demultiplexer 1114 which also may include a combination of directional couplers 1126 and optical interleaving filter 1128.

The narrow-band filter shapes found at the multiplexer 1112 and demultiplexer 1114 may induce strong inter symbol interference (ISI) due to their narrow bandwidth with respect to the spectral width of the optical data channel. Intra channel ISI is highly data pattern dependent and thus, the ISI induced penalty can be effectively reduced by using embodiments of the distortion compensation system and method described above.

Accordingly, embodiments of the distortion compensation system and method described herein may mitigate the data pattern dependent signal distortion and improve performance of a communication system such as an optical communication system.

Consistent with one embodiment, a system is provided for compensating for data pattern dependent signal distortion in a signal. The system includes a distortion compensation table configured to store a plurality of distorted signal waveforms associated with known data patterns and distortion compensation values associated with the distorted signal waveforms, the distorted signal waveforms having a length. The system also includes a distortion compensator configured to obtain a portion of a received signal corresponding to the length of the distorted signal waveforms stored in the distortion compensation table, to compare a received signal field with the distorted signal waveforms in the distortion compensation signal table, to select a distortion compensation value associated with a distorted signal waveform that corresponds most closely with the received signal field, and to compensate the received signal using the selected distortion compensation value.

Consistent with another embodiment, digital signal processor (DSP) based receiver includes: a coherent receiver configured to receive, detect and digitize a modulated optical signal to produce received signal samples; and a DSP configured to store a distortion compensation table including a plurality of distorted signal waveforms associated with known data patterns and distortion compensation values associated with the distorted signal waveforms, to obtain a portion of a received signal having a length corresponding to a length of the distorted signal waveforms stored in the distortion compensation table, to compare a received signal field with the distorted signal waveforms in the distortion compensation table, to select the distortion compensation value associated with the distorted signal waveform in the distortion compensation table that corresponds most closely with the received signal field, and to compensate the received signal using the selected distortion compensation value.

Consistent with a further embodiment, a distortion compensation method is provided for compensating for data pattern dependent signal distortion in a signal. The method includes: providing a distortion compensation table including a plurality of distorted signal waveforms associated with known data patterns and distortion compensation values associated with the distorted signal waveforms; receiving a modulated optical signal and converting the modulated optical signal into a digitized electrical signal; processing the digitized signal in a digital signal processor to obtain a portion of the received signal having a length corresponding to a length of the distorted signal waveforms stored in the distortion compensation table, to compare a received signal field with the distorted signal waveforms in the distortion compensation table, to select the distortion compensation value associated with the distorted signal waveform that corresponds most closely with the received signal field, and to compensate the received signal using the selected distortion compensation value.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for compensating for data pattern dependent signal distortion in a signal, the system comprising:
   a distortion compensation table configured to store a plurality of distorted signal waveforms associated with known data patterns and distortion compensation values associated with the distorted signal waveforms, the distorted signal waveforms having a length; and
   a distortion compensator configured to obtain a portion of a received signal corresponding to the length of the distorted signal waveforms stored in the distortion compensation table, to compare a received signal field with the distorted signal waveforms in the distortion compensation signal table, to select a distortion compensation value associated with a distorted signal waveform that corresponds most closely with the received signal field, and to compensate the received signal using the selected distortion compensation value.

2. The system of claim 1 further comprising a trainer configured to generate the distorted signal waveforms and associated distortion compensation values stored as the distortion compensation table.

3. The system of claim 2 wherein the trainer is configured to receive a signal associated with a training data sequence, to arrange received signal waveforms into data pattern dependent sets based on data patterns in the training data sequence, to calculate distortion compensation values for the received signal waveforms, and to store the received signal waveforms with the distortion compensation values as the distortion compensation table indexed by the data patterns.

4. The system of claim 1 wherein the distortion compensation table is configured to store N-symbol distorted signal waveforms including a predetermined number (N) of symbols.

5. The system of claim 1 wherein the distortion compensator is configured to use maximum a posteriori probability (MAP) detection to compare the received signal field with the stored distorted signal waveforms and to determine a distorted signal waveform that corresponds most closely with the received signal field.

6. The system of claim 1 wherein the distortion compensator is configured to compare the received signal field with the stored distorted signal waveforms and to determine a distorted signal waveform that corresponds most closely with the received signal field by calculating Euclidean distances between the received signal field and the distorted signal waveforms in the distortion compensation table and by selecting the distortion compensation value associated with the stored distorted signal waveform having the minimum Euclidean distance.

7. The system of claim 1 wherein the received signal is an electrical signal converted from a modulated optical signal on which data is modulated using phase shift keying, and wherein the electrical signal represents phases of symbols in the modulated optical signal.

8. The system of claim 7 further comprising a carrier phase estimation function configured to provide a carrier phase estimate in response to the compensated received signal and a decision function configured to determine data values from the electrical signal in response to the carrier phase estimate to provide an output representative of the data modulated on the optical signal.

9. The system of claim 8 further comprising a soft decision forward error correction (FEC) decoder configured to receive a soft-decision data stream from the decision function and to decode encoded data represented by the soft decision data stream to produce decoded data.

10. A digital signal processor (DSP) based receiver comprising:
    a coherent receiver configured to receive, detect and digitize a modulated optical signal to produce an electrical signal including received signal samples; and
    a DSP configured to store a distortion compensation table including a plurality of distorted signal waveforms associated with known data patterns and distortion compensation values associated with the distorted signal waveforms, to obtain a portion of a received signal having a length corresponding to a length of the distorted signal waveforms stored in the distortion compensation table, to compare a received signal field with the distorted signal waveforms in the distortion compensation table, to select the distortion compensation value associated with the distorted signal waveform in the distortion compensation table that corresponds most closely with the received signal field, and to compensate the received signal using the selected distortion compensation value.

11. The DSP based receiver of claim 10 wherein the modulated optical signal is modulated using phase shift keying, and wherein the electrical signal represents phases of symbols in the modulated optical signal.

12. The DSP based receiver of claim 11 wherein the DSP is configured to perform a carrier phase estimation function to provide a carrier phase estimate in response to the compensated received signal and to perform a decision function to determine data values from the electrical signal in response to the carrier phase estimate to provide an output representative of the data modulated on the optical signal.

13. The DSP based receiver of claim 12 further comprising a soft decision forward error correction (FEC) decoder configured to receive a soft-decision data stream from the decision function and to decode encoded data represented by the soft decision data stream to produce decoded data.

14. The DSP based receiver of claim 10 wherein the distortion compensation table is configured to store N-symbol distorted signal waveforms including a predetermined number (N) of symbols.

15. The DSP based receiver of claim 10 wherein the DSP is configured to receive a signal associated with a training data sequence, to arrange received signal waveforms into data pattern dependent sets based on data patterns in the training data sequence, to calculate distortion compensation values for the received signal waveforms, and to store the received signal waveforms with the distortion compensation values as the distortion compensation table indexed by the data pattern.

16. A distortion compensation method for compensating for data pattern dependent signal distortion in a signal, the method comprising:
provic1ing a distortion compensation table including a plurality of distorted signal waveforms associated with known data patterns and distortion compensation values associated with the distorted signal waveforms;
receiving a modulated optical signal and converting the modulated optical signal into a digitized electrical signal;

processing the digitized signal in a digital signal processor to obtain a portion of the received signal having a length corresponding to a length of the distorted signal waveforms stored in the distortion compensation table, to compare a received signal field with the distorted signal waveforms in the distortion compensation table, to select the distortion compensation value associated with the distorted signal waveform that corresponds most closely with the received signal field, and to modify the received signal using the selected distortion compensation value to compensate for distortion.

17. The distortion compensation method of claim 16 wherein the distortion compensation table is configured to store N-symbol distorted signal waveforms including a predetermined number (N) of symbols.

18. The distortion compensation method of claim 16 wherein comparing the received signal field with the stored distorted signal waveforms includes calculating Euclidean distances between the received signal field and the distorted signal waveforms in the distortion compensation table, and wherein selecting the distortion compensation value includes selecting the distortion compensation value associated with the stored distorted signal waveform having the minimum Euclidean distance.

19. The distortion compensation method of claim 16 wherein the digitized signal is further processed to rotate the phase of the received signal field, to compare multiple phase rotations of the received signal field with the distorted signal waveforms, and to select the distortion compensation value associated with the distorted signal waveform that corresponds most closely to the received signal field after considering each of the phase rotations.

20. The distortion compensation method of claim 16 wherein the modulated optical signal is demultiplexed from a wavelength division multiplexed (WDM) signal modulated using 2-polarization QPSK channels with a symbol rate of about 25 Gbaud on about 25 GHz WDM spacing, and wherein the modulated optical signal transmits data at about 100 Gb/s.

* * * * *